United States Patent
Filatov et al.

(10) Patent No.: US 6,304,015 B1
(45) Date of Patent: Oct. 16, 2001

(54) MAGNETO-DYNAMIC BEARING

(76) Inventors: Alexei Vladimirovich Filatov, 388 Dillard 127C, Charlottesville, VA (US) 22904; Adrian Keith Salter, 7 Woodville Road, New Barnet, Herts, London (GB), EN5 5H0

( * ) Notice: Subject to any disclaimer, the term of this patent is extended or adjusted under 35 U.S.C. 154(b) by 0 days.

(21) Appl. No.: 09/585,175

(22) Filed: Jun. 1, 2000

Related U.S. Application Data

(63) Continuation-in-part of application No. 09/311,374, filed on May 13, 1999, now abandoned.

(51) Int. Cl.$^7$ ............................................. H02K 7/09

(52) U.S. Cl. ............................................. 310/90.5

(58) Field of Search ..................... 310/90.5, 90, 103, 310/105, 166, 168, 261, 268

(56) References Cited

U.S. PATENT DOCUMENTS

| | | | |
|---|---|---|---|
| 3,572,854 | * 3/1971 | Danby | 310/90.5 |
| 5,302,874 | 4/1994 | Pinkerton | 310/90.5 |
| 5,469,006 | * 11/1995 | Pinkerton | 310/90.5 |
| 5,471,105 | 11/1995 | Clifton et al. | 310/90.5 |
| 5,508,573 | 4/1996 | Andrews et al. | 310/90.5 |
| 5,789,837 | 8/1998 | Shin et al. | 310/90.5 |
| 5,847,480 | 12/1998 | Post | 310/90.5 |

\* cited by examiner

*Primary Examiner*—Nestor Ramirez
*Assistant Examiner*—Dang Dinh Le
(74) *Attorney, Agent, or Firm*—Parker and DeStenfano

(57) ABSTRACT

A structure of a passive magnetic bearing and a method to provide non-contact suspension of a rotor when it rotates above a critical speed are presented. Non-contact suspension is achieved without usage of additional electronic units and external energy supply. The key component of the structure is a radial passive magnetic bearing, which is aimed to provide a unique and stable radial equilibrium position of a rotating above a critical speed disk. This goal is achieved by using the interaction of currents being induced in shortened conducting loops (not superconducting) installed on the disk with axial component of a magnetic field emanated from immovable permanent magnets. Compared to other passive magnetic bearings taking advantage of the interaction of a current induced in conducting loops mounted on the rotor with external magnetic field, the proposed bearing is featured by less strict requirements for the manufacturing accuracy, less frictional losses and better load characteristics. Besides, when subjected to an external load, it responses with a constant force, not oscillating one. If combined with an axial passive magnetic bearing, this radial passive magnetic bearing can be used to achieve stable non-contact suspension of a rotor with respect to lateral displacements along all three coordinate axes and with respect to angular deflections about two radial coordinate axes, while exerting no torque about the rotor rotation axis.

12 Claims, 10 Drawing Sheets

MAGNETO-DYNAMIC BEARING

CROSS-REFERENCES TO RELATED APPLICATIONS

This application is a continuation-in-part of U.S. patent application, Ser. No. 09/311,374 filed May 13, 1999, now abandoned the disclosure of which is incorporated herein by reference, as though recited in full.

BACKGROUND OF THE INVENTION

1. Field of the Invention

This invention relates to a high rotation speed, near-frictionless bearing. More specifically, the invention is directed towards a passive magnetic bearing, which provides non-contact suspension of a rotor, rotating above critical speed, without usage of external energy supplies and control systems.

2. Brief Description of the Prior Art

Conventional mechanical bearings provide high load capacity and high stiffness but limited durability especially under high rotation speed. Great friction loss, noise and requirement of lubricants also make use of a mechanical bearing impracticable under high rotation speeds or severe environments such as under low temperature or in vacuum.

Other types of bearing are liquid or gas film bearings, which usually can be classified as self-acting or externally pressed. They all cannot operate in vacuum and are featured by appreciable frictional losses. Besides, the externally pressed bearings require very complicated pneumatic or hydraulic system, including pumps, valves, seals and conduits for their operation. On the other side, self-acting bearings are featured by very small size of a clearance (near 25 $\mu$in), which makes them very sensitive to any contamination.

The most suitable for operation under high speeds and in severe environments are bearings making use of magnetic interaction to achieve non-contact suspension of a rotor. However, when designing such bearings, one needs to consider an important limitation, resulting from physics issue known as Earnshaw's theorem. Applying this theorem to magnetic systems, it can be stated that stable non-contact levitation of a body cannot be achieved by utilizing only interaction between permanent magnets or between permanent magnets and soft-magnetic elements. In particular, for the case of rotation bearings utilizing interaction between permanent magnets or between permanent magnets and soft-magnetic elements to suspend a rotor, Earnshaw's theorem states that if stable suspension is achieved in the axial direction, it will be unstable in the radial direction and vice versa. In conventional active magnetic bearings, stable suspension in all directions is achieved by introducing an external control of magnetic field supporting the rotor. Obviously, for the magnetic field to be controllable it cannot be generated only by permanent magnets but at least partially needs to be generated by electromagnets. This is the cause of such shortages of active magnetic bearings as continuous external energy consumption and requirement of complicated feedback control system. Moreover, active magnetic bearings were found not be able to compensate short high-amplitude force pulses because of the limitations of the current variation speed in the control coils, which are imposed by the coil inductance and maximal voltage, which can be applied by the control unit.

Another type of magnetic bearings exploits the interaction of a superconductor with an external magnetic field. Such systems are absolutely stable and external controls are not needed for their operation. However, the requirement of cooling down superconductors to cryogenic temperatures restricts significantly the area of their applications. Besides, there are some properties of superconducting bearins, which further complicate their application even at low temperatures. First of all it is to be noted that those of practical interest are mainly superconducting magnetic bearings utilizing recently discovered so called high-temperature superconductors, which are capable of operation at the temperature well above the boiling point of liquid nitrogen. However, these materials are extremely brittle, difficult to manufacture and what is more important, they exhibit very complicated electromagnetic properties, which result in a complicated behavior of a bearing making use of them. In particular, most such bearings are featured by a strong force-displacement hysteresis resulting from the remagnetization hysteresis of a superconducting material being exposed to a magnetic field varying upon displacements of the rotor. This force-displacement hysteresis causes unpredictability of the rotor position and may even cause bearing failure under influence of vibrations. The other source of the rotor position ambiguity is so called magnetic flux creep in type II superconductors, which results in changes of the rotor equilibrium position with time even under steady loads. And, finally, there is always a problem of how to set the rotor at the desired equilibrium position at the very beginning when superconductors just turned into superconducting state. In the first approximation, neglecting influence of the remagnetization hysteresis and magnetic flux creep, the rotor in superconducting bearings tends to stay in the position where it was when superconductors turned into superconducting state. If, however, we had kept the rotor in the desired position during transition into superconducting state, then after some load was applied on it after transition ends and then removed, we will find the rotor being significantly displaced from the original position. This will happen because of the flux creep in superconductors, which is much bigger for the first time when we induce a current in a superconductor than for subsequent times. The problems relating to the long-term influences of the superconductor remagnetization hysteresis and magnetic flux creep are successfully solved in superconducting magnetic bearing design described in U.S. Pat. No. 5,789,837. In contrast to other superconducting bearings making use of the interaction of bulk superconductors with magnetic field, this design takes advantage of interaction of currents being induced in shortened superconducting turns mounted on the stator around stator axis with axial magnetic field emanated from a rotor. The currents in the turns are induced automatically whenever the rotor is displaced from an equilibrium position in a radial direction due to the change of the external magnetic fluxes through the turns. The influence of remagnetization hysteresis is reduced in this bearing because only minimal volume of superconducting materials is exposed to varying magnetic field. To reduce long-term influence of magnetic creep in this bearing, it is proposed to rotate the stator together with superconducting turns mounted on it with a low speed about its axis. To provide possibility of such a rotation, stator may be mounted in usual mechanical bearings, which will last for long because the stator rotation speed is low. At the same time rotation speed of the rotor suspended without mechanical contact can be very high. In this case long-term influence of magnetic creep will be essentially eliminated due to periodic exchange of the superconducting turn positions. It is to be noticed, however, that the problem of initial setting the rotor in the desired position is not solved in this bearing either. The method of initial setting proposed in this patent implies that the rotor has a significant displacement from the desired position during transition of superconductors into superconducting state. When the transition ends, it is proposed to rotate stator about its axis not with a low speed, required to compensate long-term influence of magnetic creep, but with a speed high enough to limit rotor displacements under influence of a force oscillating synchronously with the rotor rotation, which will inevitably accompany a constant force pushing the rotor towards the central position during this setting process. When the rotor reaches the central position, there will be no constant force but the oscillating one. The problem is that this oscillating force will be comparable in magnitude with the maximal force, which could be applied on the rotor and it will last for a long time (in fact it will never decay fully). If we remember that the stator was proposed to be installed in mechanical bearings, which cannot work for long time under high speeds (especially in cryogenic environment and under high loads), then it will become clear that this method of the rotor initial setting is not practicable.

It also can be noted, that even though in specification of U.S. Pat. No. 5,789,837, it is mentioned that positions of superconducting turns and permanent magnets generating axial magnetic field can be switched, i.e. superconducting turns can be installed on the rotor while permanent magnets will be installed on the stator, this arrangement would be impracticable, if not impossible. One of the reasons is that currently known high-temperature superconductors are extremely brittle materials and if mounted on a rotor rotating with a high speed they will be destroyed by centrifugal forces. The other reason is that when mounted on the rotor, superconducting turns will carry alternating currents. There will be a mechanism for energy losses in superconductors due to their continuous remagnetization, which would take place even if superconductors were exposed to a perfectly constant external magnetic field. This is because there will be also alternating magnetic field induced by alternating current flowing in superconducting loops itself. Energy losses will appear in form of heat release in superconductors. It can be further noted that if we want to rotate a rotor at high speed, we need to keep it in vacuum (or low gas pressure environment), where heat extract is limited. As a result superconductors will heat up and lose superconducting properties what basically means that they will not be conductors at all anymore because in normal state known high-temperature superconductors exhibit very low conductivity. In other words, superconductors will trigger from superconducting to non-conducting state and bearing will not work.

Summing up, the main problems with all superconducting bearings are temperature operation diapason, which is limited to cryogenic temperatures, lack of unique and predictable rotor equilibrium position and usage of expensive and difficult to manufacture and shape superconducting materials (first of all high-temperature superconducting materials).

Recently significant interest appears towards researches directed on the development of dynamically stable magnetic bearings, in which stable non-contact suspension of the rotor can be achieved passively above some critical speed without using superconductors. An example of such structure is shown in U.S. Pat. No. 5,302,874. This structure utilizes closed conductive loops moving through series of magnetic fields when the rotor rotates with respect to the stator. We use tern "conductive loop" here as in original text of U.S. Pat. No. 5,302,874 implying that loop material has a finite conductivity, in contrast to superconducting materials which can be thought as having infinite conductivity. The loops can be installed either on the rotor or on the stator, but if they are installed on the rotor, the sources of the magnetic fields must be installed on the stator and vice versa. The magnetic fields are situated with respect to the loops in such a manner that if the rotor is settled in the prescribed positions in both axial and radial directions, the loops are moving along so called prescribed path, where the net magnetic flux through the loops is substantially zero. Correspondingly, no current flows in the loops. However, if the rotor is displaced from the prescribed position either in radial or axial directions, the magnetic flux through the loops will be different from zero and will vary during the rotor rotation thus inducing alternating current in the loops. This current will interact with magnetic fields causing force acting on the rotor in the direction opposite to the displacement direction.

This method requires very high manufacturing and assembling accuracy, because if the requirement of the zero magnetic flux through the loops traveling along the prescribed path is not satisfied, there will be current flowing in the loops even when the rotor is in the prescribed position. This current will cause heating of the loops and additional drag rotation torque. Moreover, even if this requirement is satisfied when the rotor is in the rest, it is likely to be violated when the rotor rotates with high speed due to radial expansion caused by centrifugal forces. Some measures directed to avoid the undesired current flow are proposed in subsequent U.S. Pat. No. 5,471,105.

It is also to be noticed, that when a conductive loop travels through series of magnetic fields, the loop walls are exposed to fields varying from zero to maximum value. Therefore, the average magnetic field interacting with the current in the loop is much less than the maximal field generated by the magnetic system. Consequently, both current-carrying capacity of the conductive loops and energy of permanent magnets are not used fully. It obviously will result in relatively low load capacity and stiffness of the bearing. Moreover, in this bearing structure, Lorenz force acting on the current-carrying loop is directed oppositely to the rotor displacement only part of time, while during another part of time the direction of force coincides with the displacement direction. This causes further reduction of the load capacity and stiffness, which are defined by the average value of the force.

Moreover, because this bearing when subjected to an external load responds with a force pulses of an alternating nature, a mechanical resonance condition may occur if the frequency of these forces is near or equal to a natural frequency of the entire assembly. It may cause the damage of the bearing. Some measures aimed to reduce this effect are proposed in U.S. Pat. No. 5,508,573.

One more variant of a dynamically stable bearing is described in U.S. Pat. 5,847,480. The advantage of this variant is that the proposed bearing has virtually no losses under equilibrium conditions, that is, when the supported system is not subject to any acceleration except those of gravity. It is worth to be mentioned, that for this advantage to be achieved, very strong manufacturing and assembling accuracy requirements must be satisfied.

Finally, it is to be noticed, that because in all the above variants of dynamically stable passive magnetic bearings the conductive loops move through series of magnetic fields, a torque of an alternating nature can be expected to be exerted on the rotor being displaced from the prescribed position. Moreover, eddy currents will be induced in the loop walls even when the rotor is in the prescribed position. They will obviously result in additional heating the conductors and additional drag torque.

BRIEF SUMMARY OF THE INVENTION

The present invention provides a passive magnetic bearing for non-contact suspension of a rotor when it rotates above critical speed, which will have the following advantages compared to the previous embodiments:

1. It will not rely on superconducting materials as bearing described in U.S. Pat. No. 5,789,837 and therefore will be inexpensive, easy to manufacture and will have wide temperature operation range including room temperature;
2. The rotor will have a predictable, unique and asymptotically stable equilibrium position, in contrast to design described in U.S. Pat. No. 5,789,837;
3. Both current capacity of the conductors and energy of permanent magnets will be used more efficiently than in bearing described in U.S. Pat. No. 5,302,874, thus providing higher load capacity and stiffness;
4. When the bearing is subjected to an external load, it will respond with a constant force, not pulsating one in contrast to design described in U.S. Pat. No. 5,302,874;
5. Eddy currents in the conducting loop walls and, consequently, conductor heating and drag torque exerted on the rotor, will be reduced compared to design described in U.S. Pat. No. 5,302,874;
6. Inaccuracy of the loop geometry will not result in undesired currents flowing in the conducting loops as long as the rotor axis is not shifted in the radial direction from a prescribed axis, in contrast to design described in U.S. Pat. No. 5,302,874;
7. Radial rotor expansion due to centrifugal forces will not result in undesired currents flowing in the conducting loops as long as the rotor axis is not shifted in the radial direction from a prescribed axis, in contrast to design described in U.S. Pat. No. 5,302,874;
8. The bearing will exhibit virtually no frictional losses not only under equilibrium conditions, but under any purely axial load, in contrast to U.S. Pat. No. 5,847,480.

The key component of the present invention is a passive radial magnetic bearing, which provides centering the disk-shaped rotor in the radial direction when it rotates above some critical speed, while exerting almost no force on the rotor in the axial direction. The disk-shaped rotor is further referred to as a disk. This is to distinguish the part of the rotor relating to a passive radial magnetic bearing from the whole rotor in cases when we consider a suspension system including both axial and radial bearings. In more detail, the passive radial magnetic bearing ensures that the disk has a unique and asymptotically stable equilibrium position in the rotation plane when it rotates above some critical speed. This equilibrium position is a predictable: equilibrium, that is achieved when the disk center lies on a prescribed axis. Saying that the disk is in equilibrium position is equivalent to saying that there is no force acting on the disk in this position. Saying that an equilibrium position is asymptotically stable is equivalent to saying that if the disk is displaced from this position, it will tend to eventually come back and rest there. We have specified here that the equilibrium position is required to be asymptotically stable, rather than just stable, because in accordance with the definition of stability the only requirement for this system to be stable is that whenever the disk was given some initial displacement its resulting displacement does not go to infinity with time. If we want to say that disk has to return to the equilibrium position and stay there we need to use term "asymptotic stability". The necessary (but not sufficient) condition for the equilibrium to be asymptotically stable is that whenever the disk is displaced from the equilibrium there will appear a restoring force pushing it backwards. In general terms this necessary stability criterion can be formulated in terms of stiffnesses as "equilibrium position of a body can be stable in a certain direction only if gradient of the force acting on the body when it is displaced from the equilibrium in this direction is negative". The meaning of this statement will become clearer if we note that the sign of the restoring force in case of a stable equilibrium is always opposite to the sign of the displacement.

To achieve the above described goals, the proposed passive radial magnetic bearing exploits the interaction of currents being induced in shortened loops with finite conductivity and non-zero inductance installed on the disk with magnetic field emanated from immovable permanent magnets. At least three loops evenly situated around the disk axis are required. The loops are desired to consist of two arcs of different radiuses concentric with the disk axis and connected appropriately to form the loops without intersections. The magnetic field is required to be circumferentially uniform about the prescribed axis and its axial component distribution must be non-uniform in the radial direction, so that there would be change of the magnetic flux through a conducting loop whenever it is displaced in the radial direction. The magnetic field is further desired to be approximately constant above the conducting rings within the entire range of disk radial displacements. Because the field is required to be circumferentially uniform, if the disk center coincides with the prescribed axis, the magnetic field at every point of each conducting loop and the magnetic flux through the loop interior will be constant, non regarding whether the disk rotates about its axis or not. Therefore, there will be no current in the loop, no force and no torque acting on the disk. However, if the disk center is shifted from the prescribed axis in the radial direction, there will be currents induced in the conducting loops during the rotor rotation, which will interact with the magnetic field and cause a force exerted on the disk which will have a component directed towards the prescribed axis. For a given displacement, the force will be constant in time and proportional to the displacement but deflected from the displacement direction by angle, $$\theta = a\tan\left(\frac{R}{L \cdot \omega}\right),$$

where R is loop resistance, L is loop inductance and $\omega$ is the rotor rotation speed. Because there is a force directed towards the equilibrium position when the disk is displaced from it, we can say that the necessary condition for the equilibrium to be asymptotically stable is satisfied, but it may not be sufficient. In fact, it can be further shown, that disk equilibrium position in this system will be asymptotically stable if some damping is added to the system with damping coefficient, $$d > \sqrt{m \cdot f_0} \cdot \frac{\sin(\theta)}{\sqrt{\cos(\theta)}},$$

where m is disk mass, $f_0$ is the radial suspension stiffness defined as ratio of the absolute value of the restoring force vs absolute value of the disk radial displacement which caused this force. This is a small disadvantage compared to superconducting bearing described in U.S. Pat. No. 5,789, 837 where the system is always stable and it is asymptotically stable if there is any damping. In other words, in the case of a superconducting bearing the system is asymptotically stable unless damping is exactly zero, what cannot happen in a real world.

Easy to see that parameter θ is very important for the system stability. In fact, if θ approaches π/2 (what may happen if L approaches 0 and R stays finite) d will go to infinity and the system will not be realizable. This is in contrast to superconducting bearing described in U.S. Pat. No. 5,789,837, where L=0 is desirable to increase bearing stiffness and would not cause any problem because R=0. However, R not equal to zero allows to achieve a unique rotor equilibrium position and is much easier to realize because all room temperature conducting materials have non-zero resistance (finite conductivity). Therefore, the present bearing makes use of shortened loops with finite conductivity and non-zero inductance as in contrast to superconducting bearing described in U.S. Pat. No. 5,789, 837, which utilizes shortened superconducting turns with infinite conductivity and inductance desired to be as close to zero as possible. In order to be brief, the shortened loops with finite conductivity and non-zero inductance will be also referred here as conductive loops.

The requirement for the magnetic field to be approximately constant above the conducting rings within the entire range of disk radial displacements restricts eddy currents within the rings, arising due to the field variations upon the rotor rotation. Correspondingly, it limits a drag torque caused by the interaction of these currents with the magnetic field.

A structure of a passive magnetic bearing providing non-contact suspension of a rotor rotating above a critical speed with respect to lateral displacements along all three coordinate axes and with respect to angular deflections about two radial coordinate axes, while exerting no torque about the rotor rotation axis can be developed easily using the proposed radial magnetic bearing.

Such a structure includes an axial magnetic bearing making use of the interaction between permanent magnets or between permanent magnets and soft-magnetic elements in order to provide stable suspension of a rotor in the axial direction. In accordance with Earnshaw's theorem, this system being stable in the axial direction cannot be also stable in the radial directions. If the axial bearing is symmetric, there will be a rotor equilibrium position in the rotation plane, where no radial force would act on the rotor, but whenever the rotor is displaced from this position there will appear a force pushing rotor father from the equilibrium. In other words, the radial force acting on the rotor will have a positive gradient.

It can be anticipated, however, that if we combine such a passive axial bearing with the above described passive radial magnetic bearing which exerts a radial restoring force on the rotor featured by a negative gradient, and if this gradient is big enough to overcome positive radial gradient due to the axial magnetic bearing, the whole assembly will have negative force gradients in all directions, i.e. the necessary stability condition will be satisfied in all directions. In fact, it can be shown that there can be radial damping coefficient found such that the system will be stable in all the directions indeed.

It is to be noticed that if such an assembly experiences purely axial load, the radial suspension will be used only to provide stability in the radial direction. The rotor will not be shifted in the radial direction and there will be no currents flowing in conducting loops and no energy losses correspondingly.

Other features and advantages of the present invention will become more apparent from the following more detailed description, taken in conjunction with the accompanying drawings which illustrate, by way of example, the principles of the invention.

BRIEF DESCRIPTION OF THE DRAWINGS

The above and other embodiments of the present invention may be more fully understood from the following detailed description when taken together with the accompanying figures wherein similar reference characters refer to similar elements throughout and in which.

DETAILED DESCRIPTION OF THE INVENTION

Figure 1:
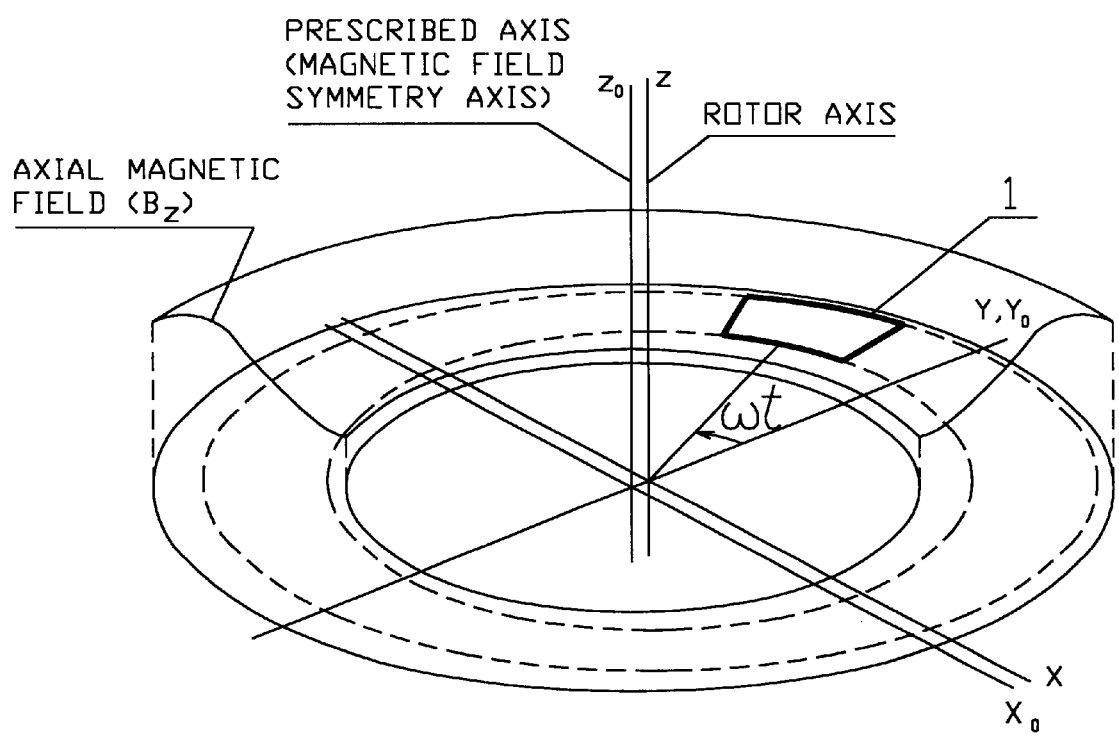
FIG. 1 and FIG. 2 are schematic drawings for the explanation of the operation principle of a passive radial magnetic bearing.
Figure 2:
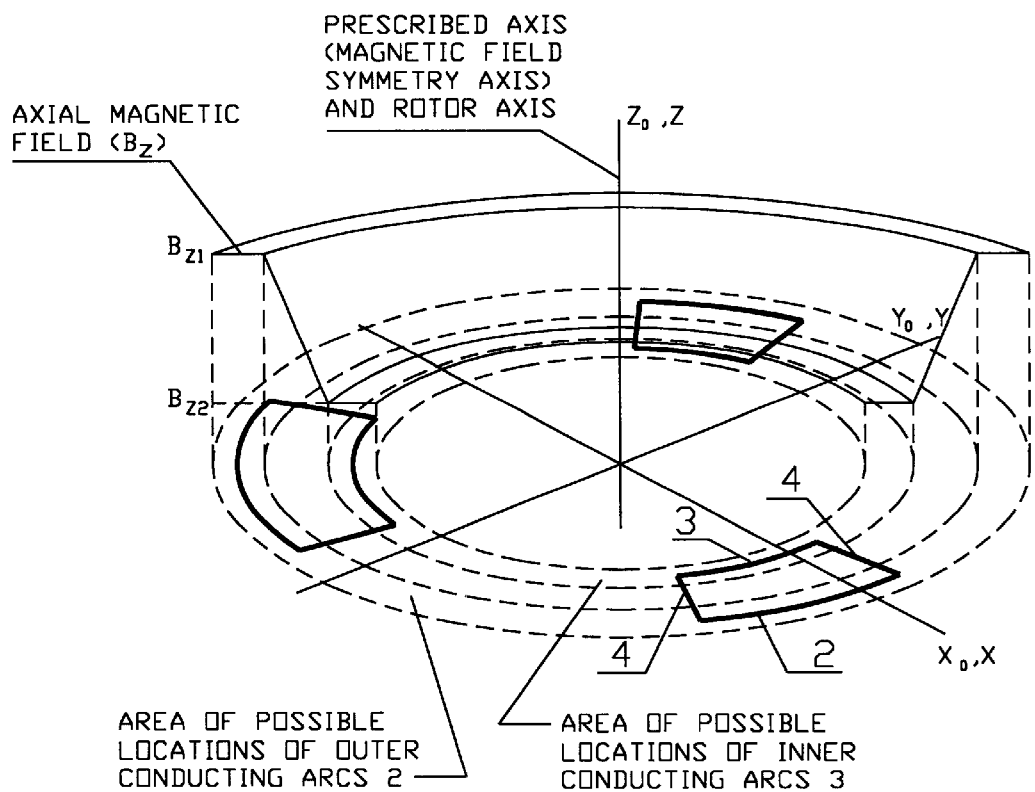

The principle of the invention is explained in FIG. 1 and FIG. 2.

FIG. 1 shows a shortened loop with finite conductivity and non-zero inductance 1 mounted on the disk-shaped rotor (further referred to as disk) and exposed to permanent axial magnetic field $B_z$, generated by magnetic means installed on the stator. The magnetic field is required to be symmetrical about prescribed axis $Z_0$ and non-uniform in the radial direction.

The coordinate frames and axis designations are as follows through all the drawings.

The coordinate frame $X_0Y_0Z_0$ is firmly linked with the stator. The disk rotation symmetry axis is designated as Z. The coordinate frame XYZ is chosen so that if disk axis Z coincides with prescribed axis $Z_0$ and the disk is in the axial equilibrium, then axis X coincides with axis $X_0$ and axis Y coincides with axis $Y_0$.

If disk axis Z coincides with prescribed axis $Z_0$, both magnetic field at every point of the loop 1 and the magnetic flux through the loop interior will be constant, non regarding whether the disk rotates about its axis Z or not, due to the magnetic field symmetry about axis $Z_0$. (For the sake of simplicity, it is assumed here that all motions of the disk are purely radial and axis Z moves parallel to itself and to axis $Z_0$. However, it can be noticed that the conclusions made here about the disk behavior in the radial direction would be also valid if, for example, axis Z were deflected by some angle from the $Z_0$ axis, in which case we shall simply replace the condition "disk axis Z coincides with prescribed axis $Z_0$" with more general "disk center lies on prescribed axis $Z_0$".) Anyway, if this condition is satisfied, there will be no current flowing in the loop, no force and no torque acting on the disk. This is true for any shape of the loop. No special requirements are imposed on the loop manufacturing accuracy. The radial expansion due to centrifugal forces will not cause undesired currents flowing in the loops as long as disk axis Z coincides with prescribed axis $Z_0$.

Actually, on the contrary to the system described in U.S. Pat. No. 5,302,874, there is no prescribed circular path, travelling along which a loop experiences zero net electromotive force, but any circular path will satisfy this requirement as long as disk axis Z coincides with prescribed axis $Z_0$. The radius of path is of no importance.

Thus we can see that when the disk axis Z coincides with prescribed axis $Z_0$, there is no force acting on the disk, i.e. the disk is in equilibrium. The next thing we need to find out if this equilibrium is stable.

Let us consider a case when disk axis Z is shifted from prescribed axis $Z_0$. For example, FIG. 1 shows the disk being shifted in the radial Y direction. The loop path during the disk rotation about its axis Z is represented by dashed lines. In this case, the magnetic flux through the loop interior will obviously vary when the disk rotates, because the radial distribution of axial magnetic field is required to be non-uniform. Therefore, a current will be induced in loop 1, which will interact with the magnetic field and cause a force exerted on the disk.

As a matter of particular interest, let us consider a system utilizing loops of a special shape shown on FIG. 2. Each loop is formed by outer arc 2, inner arc 3 and two legs 4. The arcs are concentric with disk axis Z and have close circumferential positions. Legs 4 connect the ends of arc 2 to the ends of arc 3 having closest circumferential positions (we have specified here that the ends having closest circumferential positions need to be connected in order to receive "o-shaped" loop rather than "8-shaped")). Let us also require the radial distribution of axial magnetic field to be such, that within the entire range of the disk radial displacements the outer arc 2 is exposed to virtually constant magnetic field $B_{z1}$, the inner arc 3 is exposed to virtually constant magnetic field $B_{z2}$, and these magnetic fields are different. In practice, the requirement for the magnetic field gradients to be low above the areas of possible location of conducting arcs 2 and 3 is sufficient. On FIG. 2, the areas of possible locations of conducting arcs are outlined by dashed lines. The term "Areas of possible locations of inner and outer arcs" means the areas where inner and outer arcs could be located under any radial displacement of the disk, which could be encountered during the bearing operation (operational range of the disk radial displacements). In this case, if disk axis Z is shifted from prescribed axis $Z_0$, the current induced in the loop will be given by the following equation $$I = -I_0 \cos(\omega t + \theta),$$

where $I_0$ is the current amplitude, $\omega$ is the disk rotation frequency, $$\theta = \text{arctg} \frac{R}{L\omega},$$

R and L are the loop resistance and inductance respectively.

The force acting on the loop resolved on the displacement direction (Y direction) can be presented as:

$$F_y{}^1 = -F_0(\cos\theta + \cos 2\omega t \cos\theta - \sin 2\omega t \sin\theta),$$

where $F_0{}^1$ is some coefficient.

The force acting on the loop resolved on the direction perpendicular to the displacement direction (X direction) can be presented as:

$$F_x{}^1 32\ F_0(\sin\theta - \sin 2\omega t \cos\theta - \cos 2\omega t \sin\theta).$$

However, if we install at least three loops as above, situated evenly around disk axis Z, the oscillating force components will be mutually compensated and the net force will be constant in time and given by the following equations:

$$F_y = -F_0 \cos\theta,$$

$$F_x = F_0 \sin\theta,$$

where $F_0$ is restoring force magnitude.

It can be shown that $F_0$ is proportional to the disk displacement from the prescribed axis r with some proportionality coefficient $f_0$, i.e. $F_0 = f_0 \cdot r$.

Because the magnetic field gradients above the conducting arcs 2 and 3 are low, the variations of the field within the conducting arcs upon the disk rotation will be small. Correspondingly, eddy currents induced in the arcs and drag torque caused by the interaction of these currents with the magnetic field will be minimal.

Figure 3:
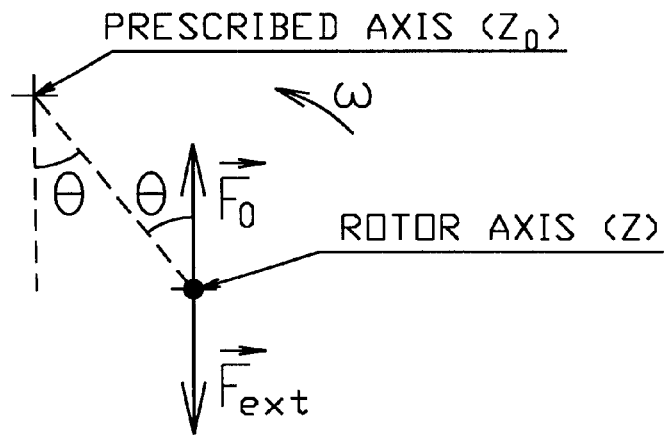
FIG. 3 is a diagram of radial forces exerted on the disk in system shown on FIG. 2 comprising at least three shortened conducting loops.

The force diagram, which will be observed when compensating external load $F_{ext}$ is shown in FIG. 3. The restoring force passes through the disk center and, therefore, cannot cause any drag torque about the disk axis. Some drag torque $M_{res}$ will appear due to the interaction of currents in legs 4 with axial magnetic field, which will be equal to $M_{res} = P/\omega$, where P is the power of resistive losses due to current flow in loops 1.

The presence of the restoring force component $F_y$ pushing the disk towards the equilibrium position allows us to conclude that the necessary condition for the equilibrium to be stable is satisfied. It can be farther shown, that the equilibrium position can be made asymptotically stable by introducing some radial damping into the system, and the amount of damping necessary to achieve stability strongly depend on $$\theta = \operatorname{arctg}\frac{R}{L\omega}$$

between the direction of the restoring force and the disk displacement. This angle is fully defined by resistance R and inductance L of loops 1 and rotation speed of the disk ω.

Let us explain influence of angle θ on the bearing stability in more details. Assuming that there are no external forces acting on the disk, the equations of the disk motion in polar coordinates r and φ can be written as follows:

$$m\cdot\ddot{r}=-f_0\cdot\cos\theta\cdot r-d_r\cdot\dot{r}+m\cdot\Omega^2\cdot r \text{(force equation in radial direction)} \quad (1)$$

and $$m\cdot r\cdot\Omega=f_0\cdot\sin\theta\cdot r-d_\tau\cdot\Omega\cdot r-2\cdot m\cdot\dot{r}\cdot\Omega \text{(torque equation about the prescribed axis).} \quad (2)$$

where m is the disk mass, $\Omega=\dot{\phi}$ is the rotation speed of the disk mass center about the bearing axis, $d_r$ and $d_\tau$ are radial and circumferential damping coefficients correspondingly.

It is to be noticed that the rotation speed of the disk mass center about the bearing axis Ω introduced here has nothing in common with the rotation speed of the disk about its axis ω. In the above equations, $f_0$ and θ depend on the rotation speed ω, but with fixed O they are fixed and we have to consider only motion of a single point (disk mass center) about the bearing axis given by these two equations.

In equation (1) the component $m\cdot\Omega^2\cdot r$ represents centrifugal force. In equation (2), the component $-2\cdot m\cdot\dot{r}\cdot\Omega$ represents Coriolius force.

The system behaviour is intuitively clear in some ultimate cases. For example if θ=0, equations (1) and (2) become $$m\cdot\ddot{r}=-f_0\cdot r-d_r\cdot\dot{r}+m\cdot\Omega^2\cdot r \quad (3)$$

$$m\cdot r\cdot\Omega=-d_\tau\cdot\Omega\cdot r-2\cdot m\cdot\dot{r}\cdot\Omega \quad (4)$$

The second equation is automatically satisfied with Ω=0, in which case the first equation becomes $m\cdot\ddot{r}=-f_0\cdot r-d_r\cdot\dot{r}$, which is just an equation describing damped oscillations. We may expect the origin to be stable in this case.

On the contrary, if θ=π/2, equations (1) and (2) become $$m\cdot\ddot{r}=-d_r\cdot\dot{r}+m\cdot\Omega^2\cdot r \quad (5)$$

$$m\cdot r\cdot\Omega=f_0\cdot r-d_\tau\cdot\Omega\cdot r-2\cdot m\cdot\dot{r}\cdot\Omega \quad (6)$$

Easy to see that if Ω≠0, than, not regarding sign of Ω, starling from an arbitrary small initial value $r_0$, r will eventually go to infinity because there is no force in the first equation able to counteract the centrifugal force $m\cdot\Omega^2\cdot r$. If we assume that there was no Ω originally, than it will appear due to the presence of $f_0$ in equation (6). Therefore, in this case the origin is unstable.

In any case, to ensure assymptotic stability of the system some damping is required. If we assume that $d_r=d_\tau=d$, then it can be shown that value of damping coefficient d required for the system to be stable is proportional to $$\frac{\sin\theta}{\sqrt{\cos\theta}}$$

and goes to infinity when θ approaches τ/2. Similarly, the required value of the damping coefficient approaches zero when θ approaches 0.

The requirement of significant damping appears to be a small disadvantage compared to superconducting bearing described in U.S. Pat. No. 5,789,837 where the system is always stable and it is asymptotically stable if there is any damping (does not matter how small it is). In other words, in the case of a superconducting bearing the system is asymptotically stable unless damping is exactly zero, what cannot happen in a real world.

Regarding, possibilities of providing necessary damping in this system, it appears that the most natural way is to employ a system similar one used for the radial suspension. With this regard, it can be noticed, that on the contrary to system described in U.S. Pat. No. 5,302,874, in the proposed system rotation of what is said to be disk about its rotation symmetry axis Z leads to completely different result than rotation of what is said to be stator about its axis $Z_0$ with the said disk being kept immovable. Thus when we rotate the sources of magnetic field shown on FIG. 2 about its symmetry axis with respect to immovable conducting turns, it cannot cause any effect (such as currents in the loops and forces exerted on the loops) non regarding the disk position with respect to conducting loops due to the field symmetry about the rotation axis. However, if we move the disk in the radial direction with some non-zero speed, it will cause change of the magnetic flux through the loops and, correspondingly, currents in the loops and forces exerted on the loops. This arrangement yielding in force acting on the disk only when it moves laterally can be used to provide disk damping.

It can be also noted that if the magnetic field emanated from the disk has some axial non-uniformity, the same structure will provide some axial damping, because there will be also flux change through conducting loops when disk moves in axial direction.

In case of the damping system, in principle there are no specific requirements for the shape or structure of the shortened conductive loops and any conductive media can be used for this purpose, but it is currently believed that multi-turn loops wound of wire (tape) will be more efficient.

If damping coefficient which can be achieved with help of the above described passive damping system is not sufficient to ensure the system stability, it can be increased by means of simple electronic circuits imbeded into breaks made in conducting loops of the damping system. Such a circuit will measure voltage induced in a loop upon disk motion and will feed back voltage of the same polarity but higher amplitude, thus causing higher current flow. This will result in a higher damping coefficient.

For very high speeds of the disk rotation, it may be found impossible to use permanent magnets mounted on the disk, because their have relatively low tensile strengthes and may be destroyed by centrifugal forces. In such situations it may be found beneficial to use soft magentic materials instead of permanent magnets. It still will be possible to design a damping system in such a way that there will be a force acting on the disk when currents flow in conducting loops of the damping system, but no voltage will be induced in the loops upon disk motions. This problem, however, can be overcome if we include additional sensors which will measure disk radial displacements (optic, eddy-current or any other sensors, which can be used for this purpose are just fine) and develop electronic circuits which will receive signals from the sensors, differentiate it once and generate currents in the damping loops proportional to the time derivatives of the disk displacements.

Figure 4:
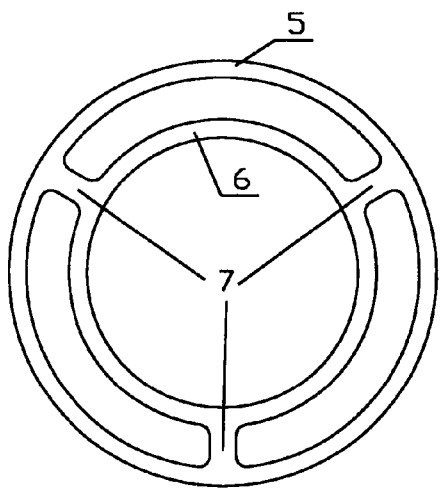
FIG. 4 shows a method to form shortened conducting loops.

Coming back to the design of conducting loops 1, FIG. 4 shows an arrangement in which three conducting loops are formed from outer conducting ring 5 and inner conducting ring 6 connected by at least three radial conducting rays 7, evenly situated around the disk axis Z.

Figure 5:
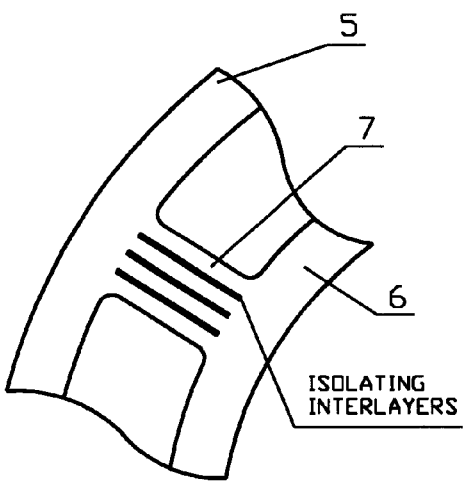
FIG. 5 shows a method to reduce eddy currents in the conducting radial legs 4 shown on FIG. 4.

The eddy currents in conducting legs 4 or radial rays 7 can be reduced by laminating the legs or rays with resistive interlayers as shown in FIG. 5.

Figure 6:
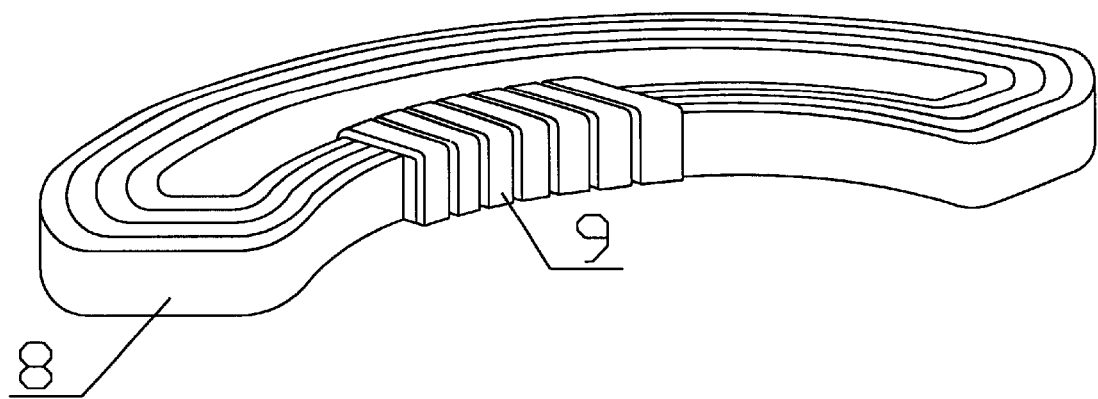
FIG. 6 shows an alternative method to form shortened conducting loops of several turns of conducting wire (tape) surrounding the loop interior.

Another method to form conducting loops is shown in FIG. 6. In this case each loop is wound of conducting wire or tape 8 and includes several turns surrounding the loop interior. The ends of the wire/tape are connected by means of conducting bridges 9. Several bridges with limited width are used rather than a single wide bridge in order to reduce eddy current losses. This replacement allows reducing eddy current while not influencing significantly the system behavior. Indeed, let $S_0$ be the cross-section area of the original solid conductor. When we replace the solid conductor with N separate turns, the cross section of each turn will be approximately $S_0/N$. The change of the magnetic flux linked with the multi-turn loop will be $N \cdot \Phi_{av}$ where $\Phi_{av}$ is the average flux through one turn. If we assume that current $I_0$ in the solid conductor was distributed uniformly through the conductor cross-section area, then magnetic field produced by this current would be exactly the same as magnetic field produced by current $I_0/N$ flowing in a multi-turn loop provided that net cross-section area is the same. Therefore, with this assumption the inductance of the multi-turn loop will be $L = N \cdot \Phi_{av}/(I_0/N) = L_0 \cdot N^2$, where $L_0 = \Phi_{av}/I_0$ is the inductance of the solid conductor. If there is a change of the external flux through a conductor $\Delta\Phi$, then current induced in the solid conductor will be $I_0 = \Delta\Phi/L_0$ while the current in the multi-turn conductor will be $I_1 = N \cdot \Delta\Phi/L = \Delta\Phi/L = \Delta\Phi/N \cdot L_0/N$ (the change of the flux linked with the multi-turn conductor will be $N \cdot \Delta\Phi$). Easy to see that net current through the loop cross-section is the same in both cases. Therefore, the force acting on a conductor exposed to an external magnetic field also will be the same.

Furthermore, it can be noticed that ratio of the loop inductance L vs resistance R and correspondingly angle $$\theta = a \tan\left(\frac{R}{L\omega}\right)$$

between the direction of the restoring force and the disk displacement are approximately the same for the solid and the multi-turn loops. Indeed, the resistance of the multi-turn loop is $R = \rho \cdot N \cdot L_{av}/(S_0/N) = R^2 \cdot R_0$, where $\rho$ is the resistivity of the loop material, $L_{av}$ is the average length of a single turn, $R_0 = \rho \cdot L_{av}/S_0$ is the resistance of the solid loop. Easy to see that $L/R = L_0/R_0$.

Considering that value and direction of the restoring force are the same in both cases, we can conclude that system behavior shall be also the same.

Figure 7:
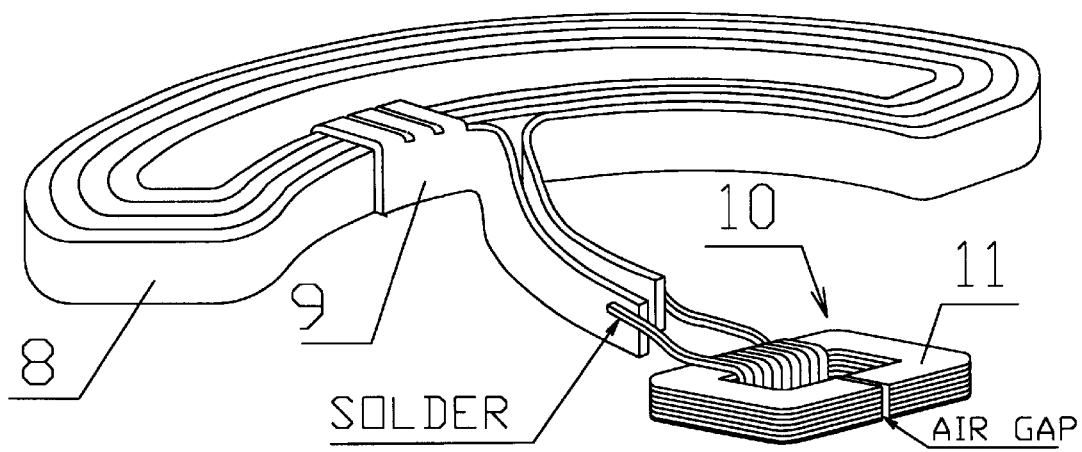
FIG. 7 shows connection of an additional inductance in series with shortened conducting loop wound as shown on FIG. 6.

In order to decrease value of $\theta$ it may be found useful to break a conducting loop and connect an additional inductance 10 (mounted on the disk as well as the conductive loop) in series with the loop as shown on FIG. 7. If this additional inductance includes a soft-magnetic core or magnetic yoke 11, overall ratio $R/L\omega$ can be reduced significantly. Some air gap needs to be provided in the magnetic yoke in order to prevent the yoke material from magnetic saturation. The magnetic yoke in fact in this case can also be considered as a soft-magnetic core shaped in a particular way. Apparently, the additional inductance together with its soft magnetic core is desired to be located away from the external magnetic field in order not to create additional forces and torques.

It has to be noticed however, that L cannot be increased very much because, as it can be shown, the radial bearing stiffness $f_0$ decreases with increase of L.

The requirement of low magnetic field gradients is automatically satisfied in the areas adjacent to the extremes of the magnetic field distribution. Thus, an arrangement where current-carrying arcs 2 and 3 or rings 5 and 6 are located in the areas of magnetic field maximum and minimum, which are desired to be of opposite signs, seems to be especially advantageous, because it provides the maximal value of Lorenz force acting on the conducting loops.

Figure 8:
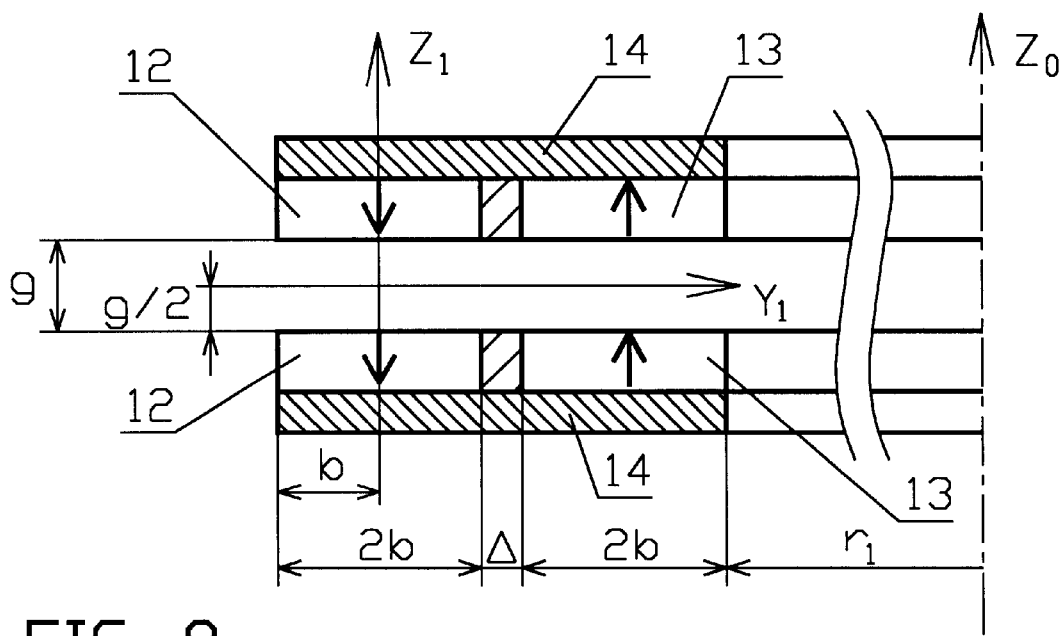
FIG. 8 shows an example of a magnetic system, which can be used to achieve magnetic field distribution close to one presented in FIG. 2.

An example of a structure to generate magnetic field satisfying the above requirements is shown on FIG. 8. This structure is similar to the structure to generate magnetic field shown in U.S. Pat. No. 5,789,837. It consists of two identical parts spaced axially, thus forming a magnetic gap between them, in which conducting loops will be situated. Each part comprises outer permanent magnet 12, inner permanent magnet 13, enclosed within outer magnet 12, and soft magnetic disc 14 attached to the magnet surfaces opposite to the gap, thus providing a path for a magnetic flux to flow between the magnets. The poles of outer magnet and inner magnet facing the gap are required to be opposite to each other as well as the poles of the magnets having the same radial positions but located on opposite sides of the gap.

Pole shoes may be installed on the magnet surfaces facing the axial magnetic gap in order to provide more uniform circumferential magnetic field distribution.

Figure 9:
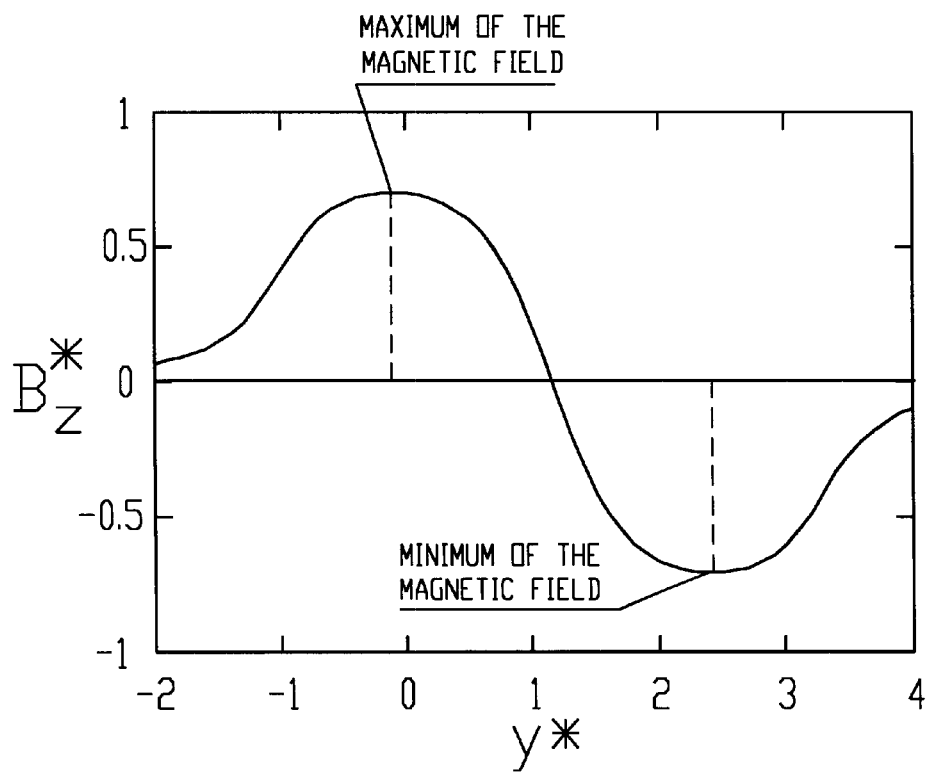
FIG. 9 shows radial distribution of axial magnetic field in the magnetic system shown on FIG. 8.

FIG. 9 shows an example of the magnetic field distribution in the middle plane of the axial magnetic gap in the system shown in FIG. 8 calculated for magnet width $2b$ being much less than inner radius $r_1$. The designations are as follows: $y^* = y_1/b$, b is half of the magnet width, $B^*_z = B_z/J$, where $B_z$ is the axial component of the magnetic field, J is the residual magnetization of the permanent magnets. The calculation has been carried out for the axial gap $g = b/1.25$ and the radial gap $\Delta = b/3$.

It can be seen, that the magnetic field gradients in some regions adjacent to the maximum and the minimum are quite low (in the points of the maximum and the minimum the gradients are known to be zero). Therefore, this magnetic field distribution meets the above defined criteria.

Figure 10:
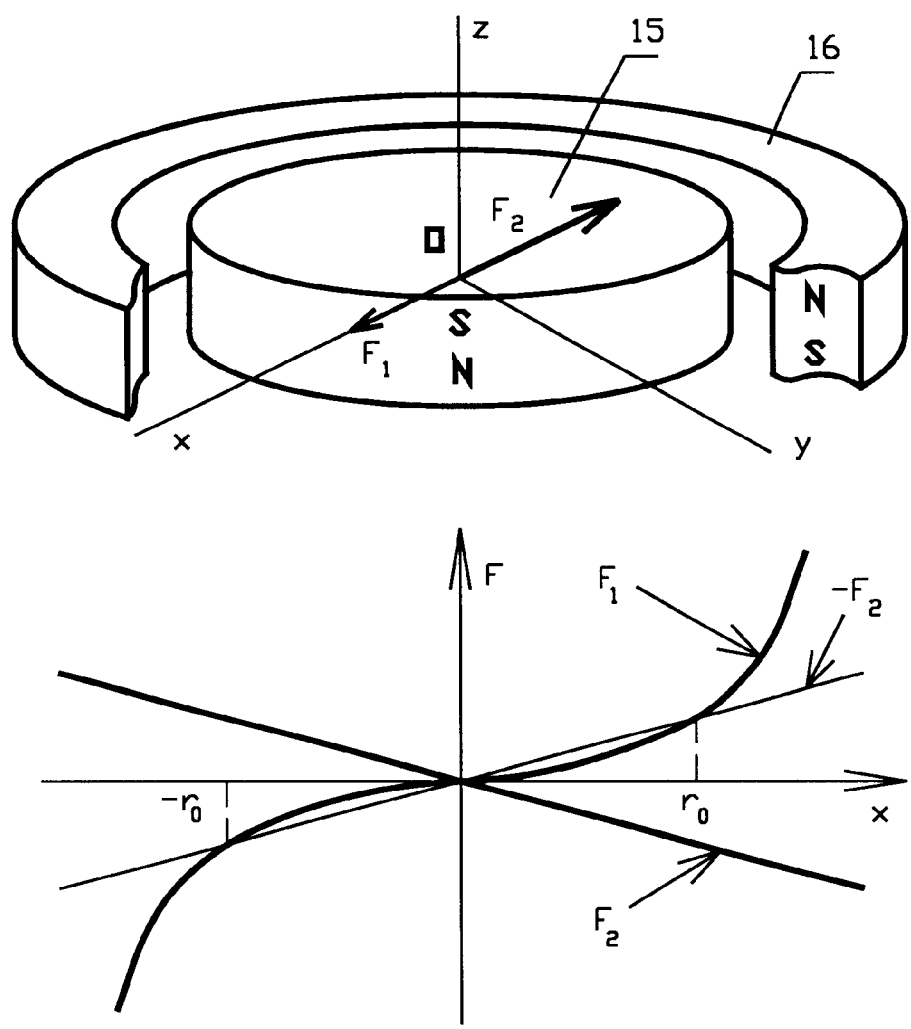
FIG. 10 explains the operation principle of the axial suspension system and interaction between axial and radial suspension systems.

How to built a bearing providing non-contact suspension of a rotor rotating above a critical speed with respect to lateral displacements along all three coordinate axes and with respect to angular deflections about two radial coordinate axes, while exerting no torque about the rotor rotation axis, using the proposed passive radial magnetic bearing can be clarified by means of a simple example. Let's consider an axial suspension system consisting of two permanent magnets (FIG. 10), one of which (15) is shaped as a disk and enclosed within the other ring-shaped magnet (16). The magnetization directions of the magnets are opposite each other.

Easy to see, that there is no torque exerted on magnet 15 about axis z, and that this arrangement is stable with respect to the axial displacements and angular deflections about radial axes (provided that radius of magnet 15 is bigger than its thickness), but unstable with respect to radial displacements. The last part means, that if magnet 15 is displaced from the central position for example in the positive direction of one of the radial axes, for example axis X, then the radial force $F_1$ exerted along this axis will be also positive, thus moving the magnet 15 further away from the central position. To make the system stable in the radial direction we need to apply a radial force $F_2$, which would have negative radial gradient. In this case, as long as absolute value of the force $F_2$ is bigger than the absolute value of the force $F_1$ (as in region $(-r_0; r_0)$ on FIG. 10), we will have total force directed towards the central position. (For simplicity both $F_1$ and $F_2$ are assumed to be exerted at the mass center of magnet 15). In our case force $F_2$ is provided by the proposed passive electromagnetic radial suspension system. If the absolute value of the radial gradient of the force $F_2$ is bigger than the absolute value of the radial gradient of the force $F_1$ within the region $(-r_0;r_0)$, this condition will be sufficient for the system stability within this region.

Figure 11:
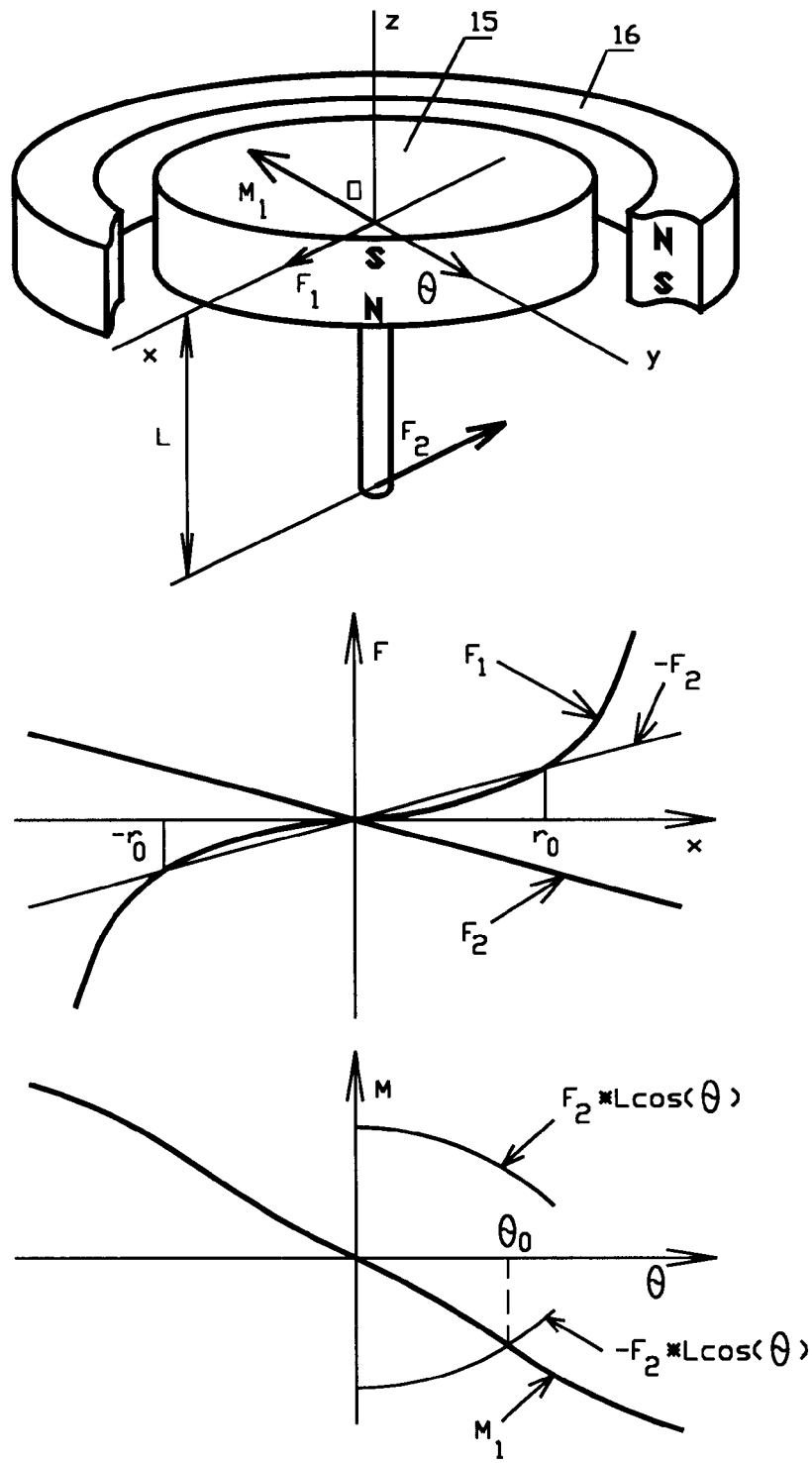
FIG. 11 explains the limitation on mutual positioning of the radial and axial suspension systems imposed by the level of tolerable rotor angular deflections about radial axes.

We assumed above that $F_1$ and $F_2$ are exerted at the mass center of magnet 15. However one can design system in such a way, that these forces will be exerted at different points. Let's assume for example that force $F_1$ is exerted at the mass center of the magnet 15 (point O) while force $F_2$ is exerted at point displaced from the point O by distance L along axis Z as shown on FIG. 11.

In this case, when compensating a radial displacement, the suspension will produce a torque about the radial axis perpendicular to the displacement axis. The magnet 15 will deflect about this axis by some angle $\theta$ and a restoring torque $M_1$ will appear. If we write down a sum of torques about the mass center of magnet 15 (point O) at the equilibrium position given by angle $\theta^0$, we will get that $M_1=F_2*L*\cos(\theta_0)$. The requirement is that the system has to be designed in such a way that angle $\theta_0$ will not exceed tolerable limits, or, in other words, will be in operational range of the rotor angular deflections about radial axes.

Figure 12:
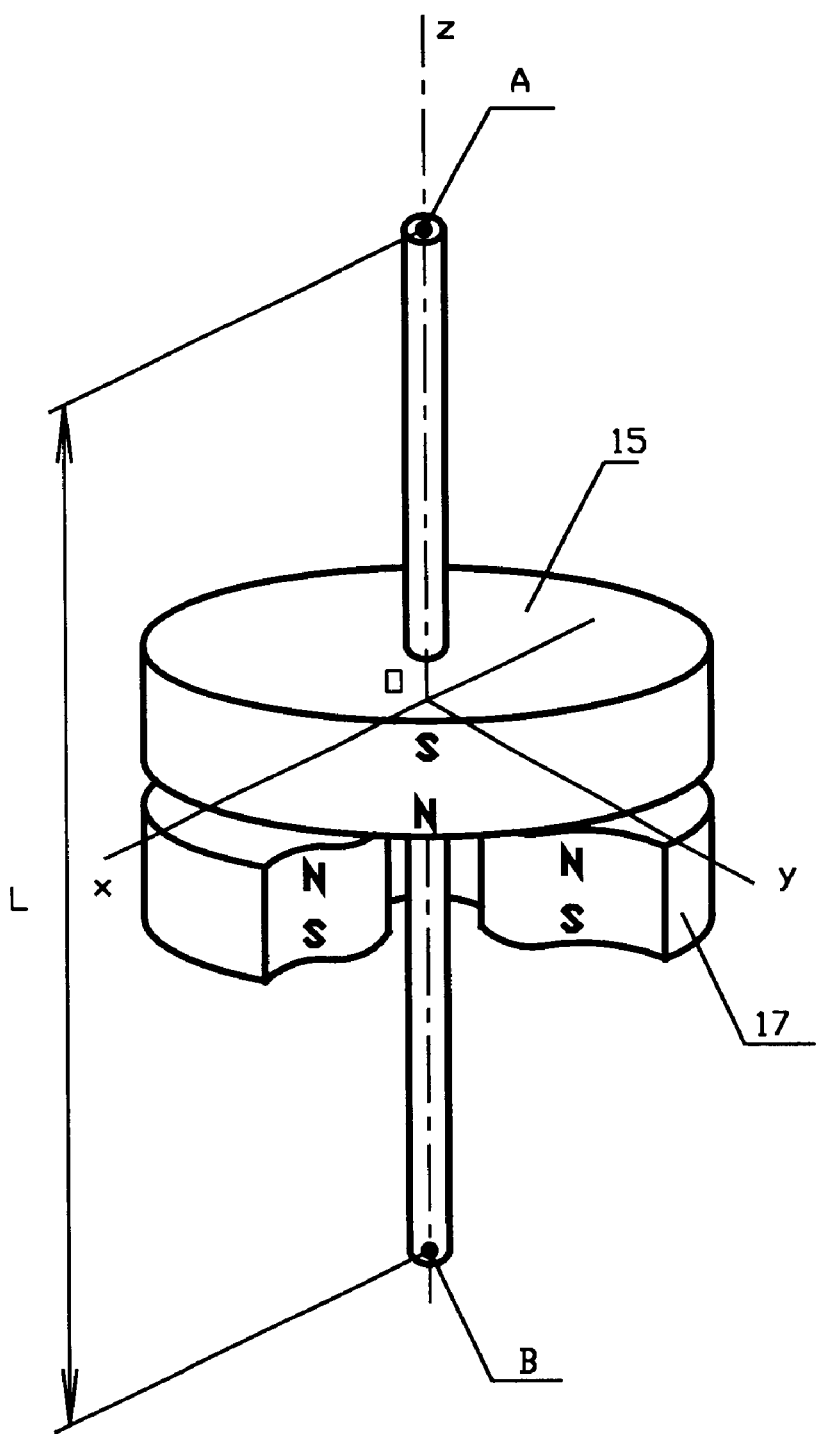
FIG. 12 shows an arrangement of permanent magnets for the axial suspension system providing compensation of constant axial load.

Another arrangement of magnets, which can be used for the axial suspension, is shown on FIG. 12. The peculiarity of this arrangement is that there is always non-zero force exerted on the magnet 15 from the opposing magnet 17. This fact becomes beneficial if there is a constant axial force such as gravity force that needs to be compensated. At the equilibrium position this system can be characterized by the value of axial force and the value of vertical force gradient. It is to be noticed that these two values do not relate directly to each other and ratio between them can be varied in wide range by proper choosing of the system sizes. As before, presence of the negative axial force gradient leads to the presence of the positive radial force gradient which is to be compensated by the proposed passive radial magnetic bearing.

It is to be noticed that in general, the magnetic system providing axial suspension is not required to be stable with respect to angular deflections about radial axes. This kind of stability can be ensured easily by using at least two above described passive radial magnetic bearings separated by some distance along the rotor axes. For example, the arrangement shown on FIG. 12 may not be stable with respect to angular deflections about radial axes. However, the full suspension can be made completely stable, if two above described passive radial magnetic bearings are used which have to be installed in such a manner that the forces, which they exert on the rotor, will applied at point A and B on the rotor axis separated by some distance L along the rotor axis such that the restoring torque due to these forces exceeds instability torque due to the interaction between the magnets over full range of the angular deflections.

Figure 13:
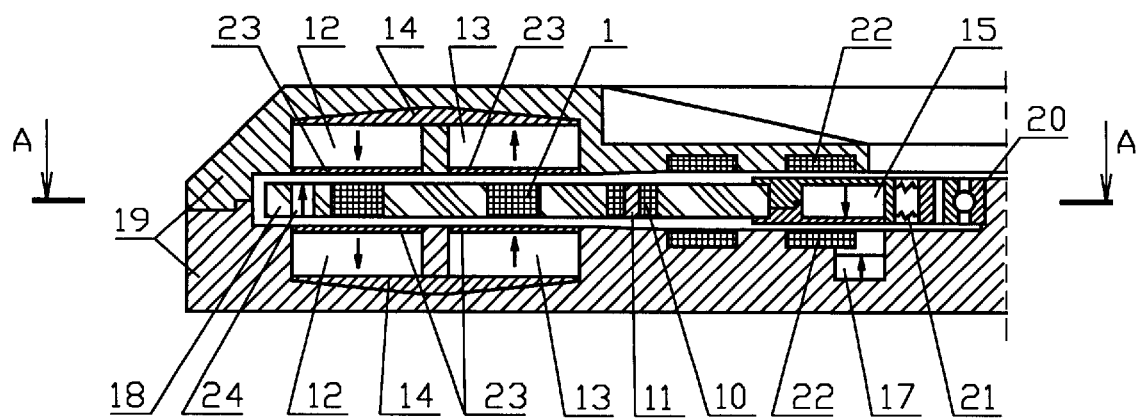
FIG. 13 is a schematic drawing of a magnetic bearing providing full non-contact suspension of a rotor.
Figure 13:
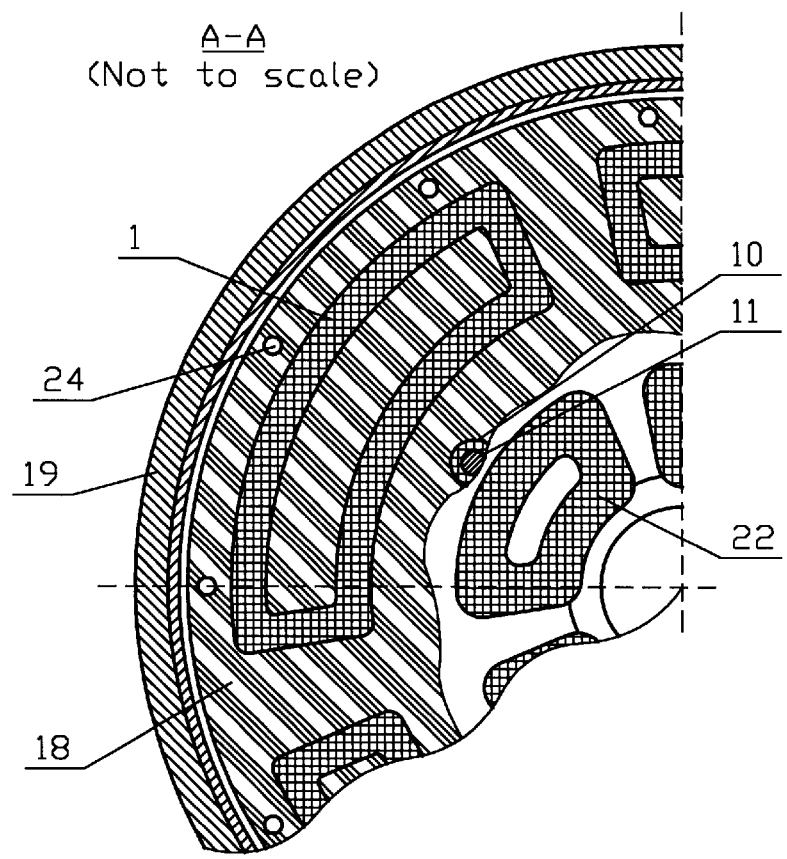

FIG. 13 shows a passive magnetic bearing employing the above described ideas to provide full non-contact suspension of rotor 18 with respect to stator 19.

The axial suspension of the rotor is achieved by using interaction between annular permanent magnets 15 mounted on the rotor and magnet 17 mounted on the stator. The magnet sizes and distance between the magnets need to be chosen so that at the equilibrium position the rotor weight will be fully compensated due to the interaction between the magnets.

In accordance with Earnshaw's theorem, such an arrangement being stable in the axial direction is unstable in the radial direction (i.e. the radial force gradient is positive) and if the rotor does not rotate, it is shifted from the central position and rests on back-up ball bearing 20. The contact between the rotor and the bearing 20 is provided through springy element 21 designed in such a way that when the bearing rotates the springy element expands under influence of the centrifugal forces and finally loses contact with the bearing. The speed when loss of the contact happens has to be higher than the speed when radial suspension system starts working. Other realizations of the back-up mechanism are obviously possible.

The passive electromagnetic radial suspension system consists of outer annular permanent magnets 12, inner annular permanent magnets 13, magnetic circuit 14 and shortened conducting loops 1 and operates as described above. Damping is provided due to the interaction of currents being induced in shortened conducting loops 22 mounted on stator 19 upon lateral motion of magnet 15. Pole shoes 23 may be used in order to achieve more uniform circumferential distribution of the magnetic field. Additional inductance 10 with soft magnetic core 11 may be found to be beneficial to achieve better system performance through decreasing angle $\theta$ (see above). Soft magnetic core has to be located far away from magnetic fields emanated from the stator.

Small magnets made of high-tensile strength magnetic material 24 located on the outer boundary of rotor 18 and exposed to oppositely oriented magnetic field from outer magnets 12 are aimed to enhance suspension stability with respect to tilting about radial axes. Even though the interaction force between magnets 24 and 12 may be small, it will contribute a lot into momentum balance about radial axes due to a long lever.

It is to be noticed that if the bearing experiences only axial load, the radial suspension is only used to provide suspension stability in the radial direction. In this case, rotor axis Z will coincide with prescribed axis $Z_0$ and there will be no currents flowing in conducting loops and no frictional losses correspondingly.

This feature is especially advantageous for some applications such as stationary fly-wheel energy storage system, where if the rotor axis is set vertical, the bearing will not experience any other load except of the axial gravity force.

Although the present invention has been disclosed in connection with a number of specific embodiments, it is believed that many different additional geometrical configurations may be used without departing from the spirit of the present invention. Additional configurations can be obtained by rearranging the shape, size, thickness, and etc., of the various structural members. Furthermore, many combinations of the various features of the present invention may be made without the exercise of additional invention in the light of the present teachings.

It is seen that the present invention and the embodiments disclosed herein are well adapted to carry out the objectives and obtain the aims. Certain changes can be made in the method without departing from the spirit and the scope of this invention. It is realized that changes are possible and it is further intended that each element recited in any of the following claims is to be understood as referring to all equivalent elements for accomplishing substantially the same result in substantially the same or equivalent manner. It is intended to cover the invention broadly in whatever form its principles may be utilized. The present invention is, therefore, well adapted to carry out the objects and obtain the ends and advantages mentioned, as well as other inherent therein.

Those skilled in the art may find many variations and adaptations thereof, and such variations and adaptations, falling within the true scope and spirit of applicant's invention, are intended to be covered thereby.

What is claimed is:

1. A passive radial magnetic bearing for use in maintaining a rotating disk in a non-contact asymptotically stable radial equilibrium when said disk is rotating above a critical speed about its rotation symmetry axis, while exerting almost no force on the disk in the axial direction and almost no torque about the disk rotation axis, comprising a) a disk;
    said disk having at least three shortened loops with finite conductivity and non-zero inductance mounted on said disk and evenly situated around said disk rotation symmetry axis;
b) a stator;
    said stator having a prescribed axis and magnetic means generating axial magnetic field uniform circumferentially about said prescribed axis and non-uniform in the radial direction, such that there is a change of magnetic flux through said shortened loops with finite conductivity and non-zero inductance whenever the disk center is displaced from said prescribed axis in said radial direction, thereby producing a radial equilibrium in which said disk center coincides with said prescribed axis;
c) a damper, said damper applying a force on said disk center whenever there is a radial disk velocity, said force being directed oppositely to said radial disk velocity vector and increasing in magnitude when said radial disk velocity increases in magnitude.

2. The passive radial magnetic bearing of claim 1, further comprising a soft-magnetic core, wherein each said shortened loop with finite conductivity and non-zero inductance consists of two portions, one of said two portions being positioned in said axial magnetic field and the other of said two portions being located away from said axial magnetic field and surrounding said soft-magnetic core.

3. The passive magnetic bearing of claim 2, wherein said damper comprises a) at least three damping shortened loops with finite conductivity mounted on said stator and evenly situated around said prescribed axis;
b) damping magnetic means mounted on said disk and generating damping axial magnetic field uniform circumferentially about said disk rotation symmetry axis and non-uniform in the radial direction, such that there is a change of magnetic flux through said damping shortened loops with finite conductivity whenever said disk center is displaced from said prescribed axis in said radial direction.

4. The passive magnetic bearing of claim 2, wherein said damper comprises a) at least three damping open conducting loops mounted on said stator and evenly situated around said prescribed axis;
b) damping magnetic means mounted on said disk and generating damping axial magnetic field uniform circumferentially about said disk rotation symmetry axis and non-uniform in the radial direction, such that there is a change of magnetic flux through said damping open conducting loops whenever said disk center is displaced from said prescribed axis in said radial direction;
c) electronic circuit, wherein said electronic circuit measures voltage induced in each said damping open conducting loop when said disk moves in a radial direction and applies additional voltage of the same polarity to the terminals of said damping open conducting loop to generate current flowing in said damping open conducting loop.

5. The passive magnetic bearing of claim 2, wherein said damper comprises:

a) at least three open damping conducting loops mounted on said stator and evenly situated around said prescribed axis;
b) a soft-magnetic disk member mounted on said disk concentric with said disk rotation symmetry axis such that there is a radial force acting on said soft-magnetic disk member whenever current flows in any of said damping open conducting loops;
c) an electronic circuit, said electronic circuit measuring the radial position of said disk and generating currents in said damping open conducting loops to apply a radial force directed oppositely to said radial disk velocity vector and increasing in magnitude when said radial disk velocity increases in magnitude.

6. The passive magnetic bearing of claim 1, wherein said damper comprises a) at least three damping shortened loops with finite conductivity mounted on said stator and evenly situated around said prescribed axis;
b) damping magnetic means mounted on said disk and generating damping axial magnetic field uniform circumferentially about said disk rotation symmetry axis and non-uniform in the radial direction, such that there is a change of magnetic flux through said damping shortened loops with finite conductivity whenever said disk center is displaced from said prescribed axis in said radial direction.

7. The passive magnetic bearing of claim 1, wherein said damper comprises:

a) at least three damping open conducting loops mounted on said stator and evenly situated around said prescribed axis;
b) damping magnetic means mounted on said disk and generating damping axial magnetic field uniform circumferentially about said disk rotation symmetry axis and non-uniform in the radial direction, such that there is a change of magnetic flux through said damping open conducting loops whenever said disk center is displaced from said prescribed axis in said radial direction;
c) electronic circuit, wherein said electronic circuit measures voltage induced in each said damping open conducting loop when said disk moves in a radial direction and applies additional voltage of the same polarity to the terminals of said damping open conducting loop to generate current flowing in said damping open conducting loop.

8. The passive magnetic bearing of claim 1, wherein said damper comprises:

a) at least three open damping conducting loops mounted on said stator and evenly situated around said prescribed axis;
b) a soft-magnetic disk member mounted on said disk concentric with said disk rotation symmetry axis such that there is a radial force acting on said soft-magnetic disk member whenever current flows in any of said damping open conducting loops;
c) an electronic circuit, said electronic circuit measuring the radial position of said disk and generating currents in said damping open conducting loops to apply a radial force directed oppositely to said radial disk velocity vector and increasing in magnitude when said radial disk velocity increases in magnitude.

9. The method of maintaining a rotating disk in a non-contact asymptotically stable radial equilibrium when said disk is rotating above a critical speed about its rotation symmetry axis, the disk center coinciding with a prescribed axis when said disk is in said equilibrium, while applying almost no force to said disk in the axial direction and almost no torque about the disk rotation axis, said disk having at least three shortened loops with finite conductivity and non-zero inductance mounted on said disk evenly situated around said disk rotation symmetry axis;

said method comprising the steps of:

a) subjecting said shortened loops with finite conductivity and non-zero inductance to a stationary axial magnetic field, said magnetic field being uniform circumferentially about said prescribed axis and non-uniform in the radial direction such that is a change of magnetic flux through said shortened conducting loops whenever said disk is displaced from said prescribed axis in said radial direction; and b) stabilizing said disk by providing sufficient radial damping to stabilize said disk.

10. The method of claim 9, wherein said disk includes damping magnetic means generating damping axial magnetic field uniform circumferentially about said disk rotation symmetry axis and non-uniform in the radial direction, further comprising the step of locating at least three stationary damping shortened loops with finite conductivity evenly situated around said prescribed axis such that there is a change of magnetic flux through said stationary damping shortened loops with finite conductivity whenever said disk is displaced from said prescribed axis in said radial direction.

11. The method of claim 9, wherein said disk includes damping magnetic means generating damping axial magnetic field uniform circumferentially about said disk rotation symmetry axis and non-uniform in the radial direction, further comprising the steps of a) locating at least three stationary damping open conducting loops evenly situated around said prescribed axis such that there is a change of magnetic flux through said stationary damping open conducting loops whenever said disk center is displaced from said prescribed axis in said radial direction;

b) measuring the voltage induced in each of three stationary damping open conducting loops mounted on said stator, and applying additional voltage of the same polarity to the terminals of said stationary damping open loop to generate current flowing in said damping open loop.

12. The method of claim 9, wherein said disk includes a soft-magnetic disk member concentric with said disk rotation symmetry axis, further comprising the steps of a) locating at least three stationary open damping conducting loops evenly situated around said prescribed axis, such that there is a radial force acting on said soft-magnetic disk member whenever current flows in any of said stationary damping open conducting loops;

b) electronically measuring the radial position of said disk and generating currents in said damping open conducting loops to apply a radial force directed oppositely to said radial disk velocity vector and increasing in magnitude when said radial disk velocity increases in magnitude.

* * * * *